(12) United States Patent
Kochi et al.

(10) Patent No.: US 9,429,255 B2
(45) Date of Patent: Aug. 30, 2016

(54) HOLLOW SEAMLESS PIPE FOR HIGH-STRENGTH SPRING

(71) Applicants: KOBE STEEL, LTD., Kobe-shi (JP); SHINKO METAL PRODUCTS CO., LTD., Kitakyushu-shi (JP); NHK SPRING CO., LTD., Yokohama-shi (JP)

(72) Inventors: Takuya Kochi, Hyogo (JP); Hitoshi Hatano, Hyogo (JP); Eiichi Tamura, Hyogo (JP); Kotaro Toyotake, Fukuoka (JP); Takashi Yajima, Kanagawa (JP); Akira Tange, Kanagawa (JP)

(73) Assignees: KOBE STEEL, LTD., Kobe-shi (JP); SHINKO METAL PRODUCTS CO., LTD., Kitakyushu-shi (JP); NHK SPRING CO., LTD., Yokohama-shi (JP)

( * ) Notice: Subject to any disclaimer, the term of this patent is extended or adjusted under 35 U.S.C. 154(b) by 0 days.

(21) Appl. No.: 14/389,866

(22) PCT Filed: Apr. 2, 2013

(86) PCT No.: PCT/JP2013/060113
§ 371 (c)(1),
(2) Date: Oct. 1, 2014

(87) PCT Pub. No.: WO2013/151059
PCT Pub. Date: Oct. 10, 2013

(65) Prior Publication Data
US 2015/0285410 A1  Oct. 8, 2015

(30) Foreign Application Priority Data
Apr. 2, 2012  (JP) ................................. 2012-084334

(51) Int. Cl.
*B22D 19/00* (2006.01)
*F16L 9/02* (2006.01)
(Continued)

(52) U.S. Cl.
CPC ................. *F16L 9/02* (2013.01); *C21D 6/008* (2013.01); *C21D 8/10* (2013.01); *C21D 9/02* (2013.01);
(Continued)

(58) Field of Classification Search
None
See application file for complete search history.

(56) References Cited

U.S. PATENT DOCUMENTS

2005/0087269 A1* 4/2005 Merwin ................ C21D 1/185
148/590
2011/0253265 A1  10/2011 Fujihara et al.
(Continued)

FOREIGN PATENT DOCUMENTS

EP  2 434 028 A1  3/2012
JP  1-247532 A  10/1989
(Continued)

OTHER PUBLICATIONS

International Search Report issued Jul. 9, 2013 in PCT/JP2013/060113 (with English language translation).
(Continued)

*Primary Examiner* — Daniel J Schleis
(74) *Attorney, Agent, or Firm* — Oblon, McClelland, Maier & Neustadt, L.L.P

(57) ABSTRACT

A hollow seamless pipe for a high-strength spring in the present invention includes a steel material in which chemical component compositions are properly adjusted, wherein a depth of a whole decarburized layer in an inner surface layer part is 100 μm or less, a depth of a flaw which is present in an inner surface is 40 μm or less, a width of the flaw is 60 μm or less, and a number density of a carbide which has a circle equivalent diameter of 500 nm or more and is present in the inner surface layer part is $1.8 \times 10^{-2}$ particles/μm² or less.

18 Claims, 1 Drawing Sheet

(a) CROSS-SECTION OF PIPE (b) SCHEMATIC DIAGRAM OF FLAW OF INNER SURFACE

(51) Int. Cl.
| | | |
|---|---|---|
| *C21D 8/10* | (2006.01) | |
| *C21D 9/02* | (2006.01) | |
| *C21D 9/08* | (2006.01) | |
| *C22C 38/00* | (2006.01) | |
| *C22C 38/04* | (2006.01) | |
| *C22C 38/06* | (2006.01) | |
| *C22C 38/20* | (2006.01) | |
| *C22C 38/24* | (2006.01) | |
| *C22C 38/28* | (2006.01) | |
| *C22C 38/34* | (2006.01) | |
| *C22C 38/42* | (2006.01) | |
| *C22C 38/46* | (2006.01) | |
| *C22C 38/50* | (2006.01) | |
| *C21D 6/00* | (2006.01) | |
| *C22C 38/02* | (2006.01) | |
| *C22C 38/44* | (2006.01) | |
| *C22C 38/48* | (2006.01) | |
| *C22C 38/54* | (2006.01) | |
| *F16F 1/02* | (2006.01) | |

(52) U.S. Cl.
  CPC ............... *C21D 9/08* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/20* (2013.01); *C22C 38/24* (2013.01); *C22C 38/28* (2013.01); *C22C 38/34* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *F16F 1/021* (2013.01); *C21D 2211/004* (2013.01)

(56) References Cited

U.S. PATENT DOCUMENTS

2012/0070682 A1  3/2012  Hatano et al.
2012/0325364 A1  12/2012  Kochi et al.

FOREIGN PATENT DOCUMENTS

| JP | 2007-125588 A | 5/2007 |
| JP | 2010-265523 A | 11/2010 |
| JP | 2011-184704 A | 9/2011 |
| WO | WO2011108675 | * 9/2011 |

OTHER PUBLICATIONS

Written Opinion of the International Searching Authority issued Jul. 9, 2013 in PCT/JP2013/060113 (with English language translation).
Extended European Search Report issued Mar. 1, 2016 in Patent Application 13773106.3.

* cited by examiner (a) CROSS-SECTION OF PIPE (b) SCHEMATIC DIAGRAM OF FLAW OF INNER SURFACE

HOLLOW SEAMLESS PIPE FOR HIGH-STRENGTH SPRING

TECHNICAL FIELD

The present invention relates to a hollow seamless pipe for high-strength springs to be used in valve springs or suspension springs or the like of internal combustion engines of automobiles or the like, and particularly relates to a hollow seamless pipe for high-quality and high-strength springs in which decarburization in an inner peripheral surface thereof is reduced.

BACKGROUND ART

With a recent increasing demand for lightweight or higher output of automobiles for the purpose of a decrease in exhaust gas or improvement of fuel efficiency, high stress design has also been required for valve springs, clutch springs, suspension springs and the like which are used in engines, clutches, suspensions and the like. These springs tend to have higher strength and thinner diameter, and the load stress tends to further increase. In order to comply with such a tendency, a spring steel having higher performance in fatigue resistance and settling resistance has been strongly desired.

Further, in order to realize lightweight while maintaining fatigue resistance and settling resistance, hollow pipe-shaped steel materials having no welded part (that is to say, seamless pipes) have come to be used as materials of springs, instead of rod-shaped wire rods which have hitherto been used as materials of springs (that is to say, solid wire rods).

Techniques for producing the hollow seamless pipes as described above have also hitherto been variously proposed. For example, Patent Document 1 proposes a technique of performing piercing by using a Mannesmann piercer which should be said to be a representative of piercing rolling mills (Mannesmann piercing), then, performing mandrel mill rolling (draw rolling) under cold conditions, further, performing reheating under conditions of 820 to 940° C. and 10 to 30 minutes, and thereafter, performing finish rolling.

On the other hand, Patent Document 2 proposes a technique of performing hydrostatic extrusion under hot conditions to form a hollow seamless pipe, and thereafter, performing spheroidizing annealing, followed by performing extension (draw benching) by Pilger mill rolling, drawing or the like under cold conditions. Further, in this technique, it is also shown that annealing is finally performed at a predetermined temperature.

In the respective techniques as described above, when the Mannesmann piercing or the hot hydrostatic extrusion is performed, it is necessary to heat at 1,050° C. or more or to perform annealing before or after cold working, and there is a problem that decarburization is liable to occur in an inner peripheral surface and outer peripheral surface of the hollow seamless pipe at the time of heating or working under hot conditions or in a subsequent heat treatment process. Further, at the time of cooling after the heat treatment, decarburization (ferrite decarburization) caused by the difference between the solute amount of carbon in ferrite and that in austenite also occurs in some cases.

When the decarburization as described above occurs, it happens that surface layer parts are not sufficiently hardened in the outer peripheral surface and inner peripheral surface in a quenching step at the time of spring production, which causes a problem that sufficient fatigue strength cannot be secured in springs to be formed. Further, in the case of usual springs, residual stress is usually imparted to an outer surface by shot peening or the like to improve the fatigue strength. However, in the case of springs formed by the hollow seamless pipe, shot peening cannot be performed in the inner peripheral surface, and flaws are liable to occur in the inner peripheral surface by a conventional processing method. Accordingly, there is also a problem that it becomes difficult to secure the fatigue strength of the inner surface.

As a technique for solving the above-described problems, a technique disclosed in Patent Document 3 is also proposed. In this technique, a rod material is hot-rolled, followed by piecing with a gun drill, and being subjected to cold working (draw benching or rolling), thereby producing a seamless steel pipe. Accordingly, heating can be avoided during piercing or extrusion.

CITATION LIST

Patent Literature

[Patent Document 1] JP-A-1-247532
[Patent Document 2] JP-A-2007-125588
[Patent Document 3] JP-A-2010-265523

SUMMARY OF INVENTION

Technical Problem

However, in the technique disclosed in Patent Document 3, annealing is performed at a relatively low temperature of 750° C. or lower (regarding this point, the same as the technique disclosed in Patent Document 2). When the annealing is performed at such a low temperature, there is another problem in that the coarsening of carbides is likely to be accelerated.

Coarse carbides remain in an insoluble state during heating and quenching, which leads to a decrease in hardness and generation of a defective hardened structure and thus causes a decrease in fatigue strength (in other words, "durability"). In particular, recently, in a quenching process during spring production, short-time heat treatment using induction heating has been mainly performed from the viewpoint of reducing decarburization and regarding the size of facilities, and thus, carbides in an insoluble state are significantly likely to remain.

Further, recently, a higher level of fatigue strength than that of the conventional art is required, and the techniques which have hitherto been proposed cannot satisfy the required fatigue strength and are insufficient in durability.

The present invention has been made under such circumstances, and an object thereof is to provide a hollow seamless pipe for high-strength springs, in which the occurrence of decarburization in an inner surface layer part (surface layer part in an inner peripheral surface) thereof is reduced as much as possible, and sufficient fatigue strength can be secured in springs to be formed, by controlling the form of a flaw present in an inner surface thereof.

Solution to Problem

According to the present invention which can achieve the above-described object, it is a hollow seamless pipe for a high-strength spring, including a steel material including 0.2% to 0.7% (which represents "mass %"; hereinafter, the same shall be applied regarding the chemical component composition) of C, 0.5% to 3% of Si, 0.1% to 2% of Mn, more than 0% and 0.1% or less of Al, more than 0% and 3% or less of Cr, more than 0% and 0.02% or less of P, more than 0% and 0.02% or less of S, and more than 0% and 0.02% or less of N, in which a depth of a whole decarburized layer in an inner surface layer part is 100 µm or less, a depth of a flaw which is present in an inner surface is 40 µm or less, a width of the flaw is 60 µm or less, and a number density of a carbide which has a circle equivalent diameter of 500 nm or more and is present in the inner surface layer part is $1.8 \times 10^{-2}$ particles/µm$^2$ or less. The "circle equivalent diameter" described above refers to a diameter of a circle which is converted from the area of a carbide such that the area thereof is not changed when attention is paid to the size of the carbide.

In the hollow seamless pipe for a high-strength spring according to the present invention, it is preferable that the steel material used as a material further includes at least one of the following groups (a) to (f): (a) more than 0% and 0.015% or less of B, (b) one or more kinds selected from the group consisting of: more than 0% and 1% or less of V; more than 0% and 0.3% or less of Ti; and more than 0% and 0.3% or less of Nb, (c) one or more kinds selected from the group consisting of: more than 0% and 3% or less of Ni; and more than 0% and 3% or less of Cu, (d) more than 0% and 2% or less of Mo, (e) one or more kinds selected from the group consisting of: more than 0% and 0.005% or less of Ca; more than 0% and 0.005% or less of Mg; and more than 0% and 0.02% or less of REM, and (f) one or more kinds selected from the group consisting of: more than 0% and 0.1% or less of Zr; more than 0% and 0.1% or less of Ta; and more than 0% and 0.1% or less of Hf. Depending on the kinds of the elements to be included, properties of the hollow seamless pipe (that is, a spring to be formed) are further improved.

Advantageous Effects of Invention

In the present invention, a chemical component composition of a steel material as a material is properly adjusted, and production conditions thereof are strictly defined, thereby being able to realize a hollow seamless pipe, in which the depth of a decarburized layer in an inner surface layer part is reduced as much as possible, the form of a flaw present in an inner surface thereof is controlled, and the number of coarse carbides present in the inner surface layer part is reduced. It becomes possible to secure sufficient fatigue strength in a spring to be formed from such a hollow seamless pipe.

DESCRIPTION OF EMBODIMENTS

The present inventors have studied control factors required for realizing high fatigue strength and improving durability from various angles. As the control factors for improving durability, for example, the depth of a decarburized layer and the depth of a flaw have hitherto been considered. From this point of view, various techniques have been proposed. However, in a high stress range, the techniques which have hitherto been proposed have a limit to the improvement of durability, and it is necessary to consider other factors.

As a result, it was found that, in addition to the depth of a whole decarburized layer (hereinafter, also referred to as "decarburized layer") and the depth of a flaw, the influences of the form of a flaw present in an inner surface of a steel pipe are also large. That is, by controlling the form of a flaw present in the inner surface of the steel pipe such that the width of the flaw is 60 µm or less, the durability of a hollow seamless pipe is significantly improved, and an effect thereof is significantly exhibited particularly in a high stress range.

The whole decarburized layer described in this specification is defined according to JIS G0558:2007.

Figure 1:
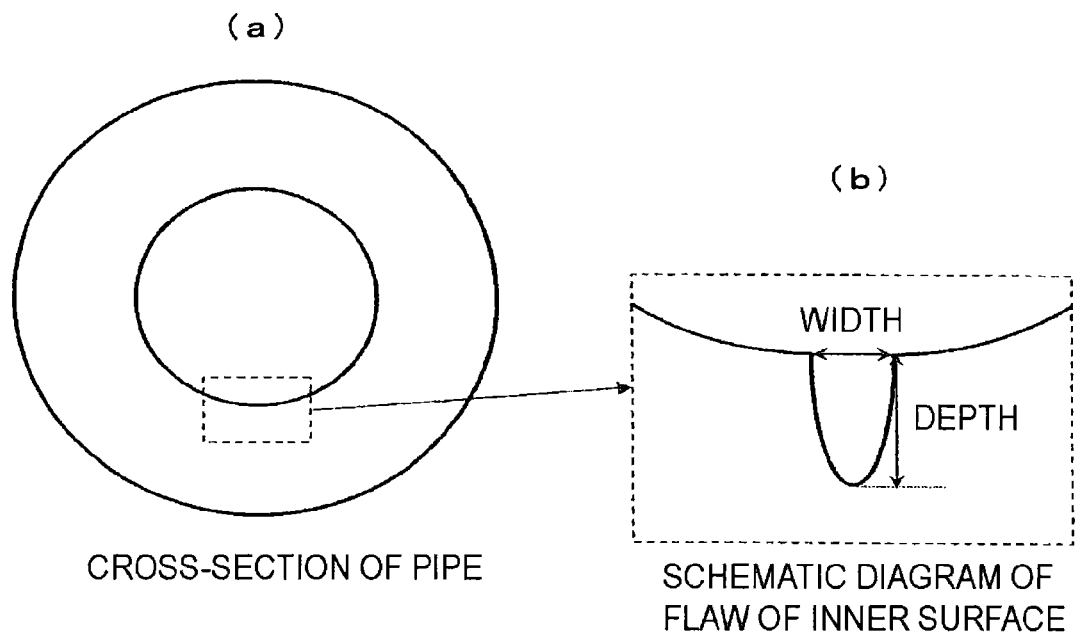
FIGS. 1(a) and 1(b) are diagrams showing the form of a flaw present in an inner surface of a pipe.

FIGS. 1(a) and 1(b) are diagrams showing the form of a flaw present in an inner surface. FIG. 1(a) is a cross-sectional view of the pipe and FIG. 1(b) is an enlarged view schematically showing the flaw in the inner surface. As shown in FIGS. 1(a) and 1(b), the flaw present in the inner surface has a width in a circumferential direction of the pipe and has a depth in a thickness direction (radial direction) thereof.

The depth and width of the flaw present in the inner surface are affected by production conditions. As means for controlling the form of the flaw, a method of controlling conditions of a pickling process and a cold working process can be considered, but the present inventors attempted to perform machine working in final process as another means. During this machine working, a seamless steel pipe (hollow seamless pipe) having a thickness more than that of a final product is used, and a surface layer of an inner peripheral surface thereof is removed by polishing and is finished into a predetermined dimension.

In the conventional art, a technique in which flaws are reduced by gun drill piecing in an intermediate process is proposed (Patent Document 3 described above). However, in this method, the occurrence of flaws in a subsequent process is out of control in practice. That is, the occurrence of pits during pickling and the occurrence of flaws during cold working are out of control. In such a technique, the occurrence of pits in a pickling process and the occurrence of flaws in a cold working process are out of control, and it is difficult to realize a hollow seamless pipe which exhibits superior durability in, particularly, a high stress range.

The present inventors have polished an inner surface layer of a steel pipe using abrasive paper to further study effects of polishing conditions on the form of a flaw present in the inner surface and the improvement of durability. As a result, by polishing 100 µm or more of the inner surface using abrasive paper having an abrasive grain size of more than 24# (having a small abrasive grain size), the depth of a decarburized layer in an inner surface layer part can be controlled to be 100 µm or less, the depth of a flaw present in the inner surface can be controlled to be 40 µm or less (preferably 30 µm or less and more preferably 20 µm or less), and the width of the flaw can be controlled to be 60 µm or less (preferably 40 µm or less and more preferably 20 µm or less). By controlling the form of the flaw as described above, the durability could be significantly improved.

The depth of a decarburized layer in an inner surface layer part can be measured as follows. A hollow seamless pipe is cut to obtain a test piece, and the depth of a decarburized layer (whole decarburized layer) in an inner surface layer part thereof is measured by observation using an optical microscope according to JIS G0558.

The depth and width of a flaw present in an inner surface is measured as follows. In order to observe an arbitrary cross-section of a pipe (a cross-section of a pipe perpendicular to an axis thereof), the pipe is cut, is filled with a resin, and is polished to obtain an observation sample. The form of the flaw present in the inner surface of the observation sample is observed using an optical microscope. The maximum depth of the flaw and the maximum width of the flaw which are observed in the cross-section are measured.

In addition, by polishing 100 µm or more of the inner surface layer, the depth of a decarburized layer can be controlled to be 100 µm or less (preferably 80 µm or less and more preferably 60 µm or less). At this time, flaws of the inner surface are removed and the depth of the flaws is reduced. However, when the abrasive grain size of abrasive paper to be used is less than 24# (when the abrasive grain size is increased), the width of the flaws becomes more than 60 µm, and the durability is not improved.

In the production methods which have hitherto been proposed, annealing is performed at a relatively low temperature of 750° C. or lower (refer to Patent Documents 2 and 3 described above). When the annealing is performed at such a low temperature, there is another problem in that the coarsening of carbides present in steel of an inner surface layer part (surface layer part of an inner surface) is likely to be accelerated. As a result of the study regarding this point, the present inventors have found that, by appropriately controlling annealing conditions, the number of coarse carbides can be reduced and the durability can be further improved. That is, by appropriately controlling annealing conditions as described below, a number density of coarse carbides having a circle equivalent diameter of 500 nm or more can be controlled to be $1.8 \times 10^{-2}$ particles/µm$^2$ or less. The number density of carbides is preferably $1.5 \times 10^{-2}$ particles/µm$^2$ or less and more preferably $1.0 \times 10^{-2}$ particles/µm$^2$ or less. In addition, the meaning of carbides according to the present invention includes carbides of carbide-forming elements (for example, Mn, Cr, V, Ti, Nb, Mo, Zr, Ta, and Hf) among steel components in addition to cementite ($Fe_3C$) present in a metallographic structure.

The number density of carbides which has a circle equivalent diameter of 500 nm or more and is present in an inner surface layer part is measured as follows. In order to observe an arbitrary cross-section (a cross-section of a pipe perpendicular to an axis thereof), the pipe is cut, is filled with a resin, is polished, and is subjected to picral corrosion to obtain an observation sample. A surface layer part thereof at a distance of 100 µm to 150 µm from an inner surface thereof is observed (×3,000 magnification) using a scanning electron microscope (SEM). Based on a SEM image (measurement positions: 3 points), the area of a carbide is measured using image analysis software (Image-Pro), followed by converting into a circle equivalent diameter. Regarding carbides having a circle equivalent diameter of 500 nm or more, the number density are measured, and the average thereof is measured.

The hollow seamless pipe in the present invention can be produced according to the procedure described below with the use of a steel material in which a chemical component composition is properly adjusted (the proper chemical component composition will be described later). Respective processes in this production method will be described more specifically.

[Hollowing Technique]

First, as a hollowing technique, an element pipe is prepared by hot extrusion, and then, it is repeatedly subjected to cold working such as rolling or draw benching, soft annealing, and pickling multiple times until a pipe having a desired diameter (outer diameter or inner diameter) and a desired length is formed. Regarding the inner diameter, it is necessary that an amount to be decreased by polishing described below is taken into consideration.

[Heating Temperature During Hot Extrusion: Lower than 1,050° C.]

In the above-mentioned hot extrusion, the heating temperature thereof is recommended to be lower than 1,050° C. When the heating temperature thereof is 1,050° C. or more, the total decarburization (whole decarburization) is increased. Preferably, it is 1,020° C. or lower.

[Cooling Condition after Hot Extrusion: Controlling an Average Cooling Rate to be 1.5° C./Sec or More Until the Temperature is Achieved to 720° C. After Extrusion]

After hot extrusion is performed under the above-described conditions, cooling is performed at a relatively high cooling rate until the temperature is achieved to 720° C. As a result, decarburization during cooling can be reduced. In order to exhibit such an effect, it is preferred that the average cooling rate until the temperature is achieved to 720° C. is adjusted to 1.5° C./sec or more. It is preferred that the average cooling rate thereof is adjusted to 2° C./sec or more.

The element pipe which has been obtained by hot extrusion is repeatedly subjected to cold working, annealing, and pickling until a pipe having a desired size is produced. At this time, it is necessary that annealing and pickling are performed under the appropriate conditions to prevent decarburization or the occurrence of flaws.

[Cold Working]

As cold working of a steel pipe, rolling or draw benching is usually performed. Rolling can be performed with relatively high reduction of area, whereas draw benching has advantageous effects in that the working rate is high and the dimensional accuracy is high. Therefore, either rolling or draw benching may be performed depending on the circumstances.

[Annealing Process]

After cold working, the hardness of the material is increased, and thus it may be difficult to perform working in a subsequent process in many cases. Therefore, annealing is performed as necessary. During this annealing, by controlling the atmosphere to be an non-oxidizing atmosphere, decarburization to be occurred during the annealing can be significantly reduced. In addition, since a produced scale can be made to be extremely thin, the dipping time during pickling which is performed after annealing can be reduced. Therefore, annealing is effective for suppressing the occurrence of deep pits caused by pickling. In addition, the heating temperature during annealing is preferably 950° C. or higher. Regarding the annealing temperature, in the conventional art (Patent Documents 2 and 3 described above), annealing is generally performed at a relatively low temperature of 750° C. or lower. However, when the annealing temperature is 750° C. or lower, the coarsening of carbides is accelerated. In the present invention, this point is focused on, and annealing is performed not at a low annealing temperature as in the conventional art but at a high annealing temperature such that carbides are dissolved.

Regarding this annealing temperature, a temperature of about 820° C. to 940° C. may be adopted (for example, Patent Document 1 described above). However, such a temperature range is still insufficient for dissolving carbides in solid. Further, in a temperature range around 900° C., ferrite decarburization is most likely to occur. Accordingly, in the present invention, the annealing temperature is set to 950° C. or higher to accelerate the dissolving of carbides in solid and to avoid the occurrence of the ferrite decarburization. This annealing temperature is more preferably 970° C. or higher and still more preferably 990° C. or higher. However, when the annealing temperature is excessively high, total decarburization (whole decarburization) is increased, and cold workability is deteriorated. Accordingly, the annealing temperature is preferably 1,100° C. or lower, more preferably 1,080° C. or lower, and still more preferably 1,040° C. or lower. By performing annealing while controlling the annealing temperature in this temperature range, a hollow seamless pipe can be produced, in which an oxidized scale is reduced, the occurrence of deep pits caused by pickling is suppressed, the depth of a decarburized layer is reduced, and the number of coarse carbides is small.

[Pickling Process]

After annealing is performed as described above, a scale is formed on a surface of the material to no small extent, which adversely affects a subsequent process such as rolling or draw benching. Therefore, pickling treatment is performed using sulfuric acid or hydrochloric acid. However, when the process time of pickling treatment is increased, large pits caused by pickling are formed and remain as flaws. From this point of view, it is advantageous to reduce the pickling time. Specifically, the pickling time is preferably within 30 minutes (more preferably within 20 minutes).

[Polishing of Inner Surface Layer Part]

In order to control the depth of a flaw present in an inner surface of a steel pipe to be 40 μm or less, to control the width of the flaw to be 60 μm or less, and to control the depth of a decarburized layer in an inner surface layer part to be 100 μm or less, the inner surface layer is polished using abrasive paper over the total length of the pipe after annealing and pickling. At this time, the abrasive grain size (#) is set to be at least 24 (preferably 30 or more), and the polishing amount (decrease amount in thickness) is set to 70 μm or more (preferably 100 μm or more).

In the hollow seamless pipe in the present invention, it is also important that the chemical component composition of the steel material used as the material is properly adjusted. Reasons for limiting the ranges of chemical components will be described below.

(C: 0.2% to 0.7%)

C is an element necessary for securing high strength, and for that purpose, it is necessary that C is contained in an amount of 0.2% or more. The C content is preferably 0.30% or more, and more preferably 0.35% or more. However, when the C content becomes excessive, it becomes difficult to secure ductility. Accordingly, the C content is required to be 0.7% or less. The C content is preferably 0.65% or less, and more preferably 0.60% or less.

(Si: 0.5 to 3%)

Si is an element effective for improving settling resistance necessary for springs. In order to impart settling resistance necessary for springs having a strength level intended in the present invention, the Si content is required to be 0.5% or more. The Si content is preferably 1.0% or more, and more preferably 1.5% or more. However, Si is also an element which accelerates decarburization. Accordingly, when Si is contained in an excessive amount, formation of decarburized layer on the surfaces of the steel material is accelerated. As a result, a peeling process for removing the decarburized layer becomes necessary, and thus, this is disadvantageous in terms of production cost. Accordingly, the upper limit of the Si content is limited to 3% in the present invention. The Si content is preferably 2.5% or less, and more preferably 2.2% or less.

(Mn: 0.1 to 2%)

Mn is utilized as a deoxidizing element, and is an advantageous element which forms MnS with S as a harmful element in the steel material to render it harmless. In order to effectively exhibit such an effect, it is necessary that Mn is contained in an amount of 0.1% or more. The Mn amount is preferably 0.15% or more, and more preferably 0.20% or more. However, when the Mn content becomes excessive, a segregation band is formed to cause the occurrence of variations in quality of the material. Accordingly, the upper limit of the Mn content is limited to 2% in the present invention. The Mn content is preferably 1.5% or less, and more preferably 1.0% or less.

(Al: 0.1% or less (not including 0%))

Al is mainly added as a deoxidizing element. Further, it not only forms MN with N to render solute N harmless, but also contributes to refinement of a microstructure. Particularly, in order to fix the solute N, it is preferred that Al is contained in an amount of more than twice the N content. However, Al is an element which accelerates decarburization, as is the case with Si. Accordingly, in a spring steel containing a large amount of Si, it is necessary to inhibit Al from being added in large amounts. In the present invention, the Al content is 0.1% or less, preferably 0.07% or less, and more preferably 0.05% or less. The lower limit of the Al content is not particularly limited, and for example, the content of Al is 10 ppm or more (Cr: 3% or less (not including 0%))

From the viewpoint of improving cold workability, the smaller Cr content is preferred. However, Cr is an element effective for securing strength after tempering and for improving corrosion resistance, and is an element particularly important in suspension springs in which high-level corrosion resistance is required. Such an effect increases with an increase in the Cr content. In order to preferentially exhibit such an effect, it is preferred that Cr is contained in an amount of 0.2% or more, and more preferably 0.5% or more. However, when the Cr content becomes excessive, not only a supercooled microstructure is liable to occur, but also segregation to cementite occurs to reduce plastic deformability, which causes deterioration of cold workability. Further, when the Cr content becomes excessive, Cr carbides different from cementite are liable to be formed, resulting in an unbalance between strength and ductility. Accordingly, in the steel material used in the present invention, the Cr content is suppressed to 3% or less. The Cr content is preferably 2.0% or less, and more preferably 1.7% or less.

(P: 0.02% or less (not including 0%))

P is a harmful element which deteriorates toughness and ductility of the steel material, so that it is important that P is decreased as much as possible. In the present invention, the upper limit thereof is limited to 0.02%. It is preferred that the P content is suppressed preferably to 0.010% or less, and more preferably to 0.008% or less. P is an impurity unavoidably contained in the steel material, and it is difficult in industrial production to decrease the amount thereof to 0%.

(S: 0.02% or less (not including 0%))

S is a harmful element which deteriorates toughness and ductility of the steel material, as is the case with P described above, so that it is important that S is decreased as much as possible. In the present invention, the S content is suppressed to 0.02% or less, preferably 0.010% or less, and more preferably 0.008% or less. S is an impurity unavoidably contained in the steel, and it is difficult in industrial production to decrease the amount thereof to 0%.

(N: 0.02% or less (not including 0%))

N has an effect of forming a nitride to refine the microstructure, when Al, Ti, or the like is present. However, when N is present in a solute state, N deteriorates toughness, ductility and hydrogen embrittlement resistance properties of the steel material. In the present invention, the upper limit of the N content is limited to 0.02% or less. The N content is preferably 0.010% or less, and more preferably 0.0050% or less. The N content is not particularly limited and is, for example, 20 ppm or more.

In the steel material applied in the present invention, the others (remainder) of the above-mentioned component is composed of iron and unavoidable impurities (for example, Sn, As, and the like), but trace components (acceptable components) can be contained therein to such a degree that properties thereof are not impaired. Such a steel material is also included in the range of the present invention.

Further, it is also effective that (a) 0.015% or less (not including 0%) of B, (b) one or more kinds selected from the group consisting of: 1% or less (not including 0%) of V; 0.3% or less (not including 0%) of Ti; and 0.3% or less (not including 0%) of Nb, (c) 3% or less (not including 0%) of Ni and/or 3% or less (not including 0%) of Cu, (d) 2% or less (not including 0%) of Mo, (e) one or more kinds selected from the group consisting of: 0.005% or less (not including 0%) of Ca; 0.005% or less (not including 0%) of Mg; and 0.02% or less (not including 0%) of REM, (f) one or more kinds selected from the group consisting of: 0.1% or less (not including 0%) of Zr; 0.1% or less (not including 0%) of Ta; and 0.1% or less (not including 0%) of Hf, or the like is contained, as needed. Reasons for limiting the ranges when these components are contained are as follows.

(B: 0.015% or less (not including 0%))

B has an effect of inhibiting fracture from prior austenite grain boundaries after quenching-tempering of the steel material. In order to exhibit such an effect, it is preferred that B is contained in an amount of 0.001% or more. However, when B is contained in an excessive amount, coarse carboborides are formed to impair the properties of the steel material. Further, when B is contained more than necessary, it contributes to the occurrence of flaws of a rolled material. Accordingly, the upper limit of the B content is limited to 0.015%. The B content is more preferably 0.010% or less, and still more preferably 0.0050% or less.

(One or more kinds selected from the group consisting of V: 1% or less (not including 0%); Ti: 0.3% or less (not including 0%); and Nb: 0.3% or less (not including 0%))

V, Ti and Nb form carbo-nitrides (carbides, nitrides and carbonitrides), sulfides or the like with C, N, S and the like to have an action of rendering these elements harmless, and further form carbo-nitrides to also exhibit an effect of refining the microstructure. Furthermore, they also have an effect of improving delayed fracture resistance properties. In order to exhibit these effects, it is preferred that at least one kind of V, Ti and Nb is contained in an amount of 0.02% or more (in an amount of 0.02% or more in total when two or more kinds are contained). However, the contents of these elements become excessive, coarse carbo-nitrides are formed to deteriorate toughness or ductility in some cases. Accordingly, in the present invention, the upper limits of the contents of Ti, V and Nb are preferably 1% or less, 0.3% or less and 0.3% or less, respectively. 0.5% or less of V, 0.1% or less of Ti and 0.1% or less of Nb are more preferred. In addition, from the viewpoint of cost reduction, 0.3% or less of V, 0.05% or less of Ti and 0.05% or less of Nb are preferred.

(Ni: 3% or less (not including 0%) and/or Cu: 3% or less (not including 0%))

For Ni, addition thereof is restrained in the case of taking into consideration cost reduction, so that the lower limit thereof is not particularly provided. However, in the case of inhibiting surface layer decarburization or improving corrosion resistance, it is preferred that Ni is contained in an amount of 0.1% or more. However, when the Ni content becomes excessive, the supercooled microstructure occurs in the rolled material, or residual austenite is present after quenching, resulting in deterioration of the properties of the steel material in some cases. Accordingly, when Ni is contained, the content thereof is 3% or less. From the viewpoint of cost reduction, the Ni content is preferably 2.0% or less, and more preferably 1.0% or less.

Cu is an element effective for inhibiting surface layer decarburization or improving corrosion resistance, as is the case with Ni described above. In order to exhibit such an effect, it is preferred that Cu is contained in an amount of 0.1% or more. However, when the Cu content becomes excessive, the supercooled microstructure occurs or cracks occur at the time of hot working in some cases. Accordingly, when Cu is contained, the upper limit thereof is 3% or less. From the viewpoint of cost reduction, the Cu content is preferably 2.0% or less, and more preferably 1.0% or less.

(Mo: 2% or less (not including 0%))

Mo is an element effective for securing strength and improving toughness after tempering. Accordingly, when M is contained, the content thereof is preferably 0.2% or more. However, the Mo content becomes excessive, toughness deteriorates. Accordingly, the upper limit of the Mo content is preferably 2% or less. The Mo content is more preferably 0.5% or less.

(One or more kinds selected from the group consisting of Ca: 0.005% or less (not including 0%); Mg: 0.005% or less (not including 0%); and REM: 0.02% or less (not including 0%))

All of Ca, Mg, and REM (rare earth element) form sulfides to prevent elongation of MnS, thereby having an effect of improving toughness, and can be added depending on required properties. Accordingly, when one or more kinds selected from the group consisting of Ca, Mg, and REM are contained, the content thereof is preferably 5 ppm or more. However, when they are added in excess of the above-mentioned upper limits, respectively, toughness is adversely deteriorated. The respective preferred upper limits are 0.0030% or less for Ca, 0.0030% or less for Mg, and 0.010% or less for REM. In the present invention, the meaning of REM includes lanthanoid elements (15 elements from La to Ln), Sc (scandium), and Y (yttrium).

(One or more kinds selected from the group consisting of Zr: 0.1% or less (not including 0%); Ta: 0.1% or less (not including 0%); and Hf: 0.1% or less (not including 0%))

These elements combine with N to form nitrides, thereby stably inhibiting the growth of the austenite (γ) grain size during heating to refine the final microstructure, which leads to an effect of improving toughness. Accordingly, when one or more kinds selected from the group consisting of Zr, Ta, and Hf are contained, the content thereof is preferably 0.03% or more. However, when each of them is added in an excessive amount of more than 0.1%, the nitrides are coarsened to deteriorate fatigue property, and such a case is not preferred. Accordingly, the content of each of them is limited to 0.1% or less. The more preferred content of each of them is 0.050% or less, and the still more preferred content is 0.040% or less.

The present invention will be described below in more detail with reference to examples, but the following examples should not be construed as limiting the present invention. All design changes in the context of the spirit described above and later are included in the technical scope of the present invention.

EXAMPLES

Various kinds of molten steels (medium carbon steels) having the chemical component compositions shown in Table 1 described below were each melted by a usual melting method. The molten steels were cooled, followed by bloom rolling to form billets having a cross-sectional shape of 155 mm×155 mm. These billets were formed into round bars having a diameter of 150 mm by hot forging, followed by machine working, thereby preparing extruded billets. In Table 1 described below, REM was added in a form of a misch metal containing about 20% of La and about 40% to 50% of Ce. In Table 1 described below, "–" shows that no element was added.

TABLE 1

| Steel Species | Chemical Component Composition (Mass %) | | | | | | | | | | |
|---|---|---|---|---|---|---|---|---|---|---|---|
| | C | Si | Mn | P | S | N | Al | Cr | Ni | Cu | Mo |
| A | 0.40 | 2.50 | 1.00 | 0.005 | 0.005 | 0.0030 | 0.0300 | 1.05 | 0.45 | 0.20 | — |
| B | 0.41 | 1.70 | 0.15 | 0.003 | 0.003 | 0.0020 | 0.0250 | 1.00 | 0.30 | 0.15 | — |
| C | 0.42 | 1.80 | 0.25 | 0.008 | 0.008 | 0.0030 | 0.0300 | 0.95 | 0.20 | 0.20 | — |
| D | 0.44 | 1.91 | 0.20 | 0.006 | 0.006 | 0.0040 | 0.0320 | 1.01 | 0.62 | 0.25 | — |
| E | 0.45 | 1.70 | 0.35 | 0.009 | 0.009 | 0.0050 | 0.0300 | 0.50 | 0.20 | 0.10 | — |
| F | 0.45 | 1.75 | 0.70 | 0.015 | 0.015 | 0.0030 | 0.0020 | 0.75 | 0.15 | 0.10 | — |
| G | 0.45 | 1.70 | 0.20 | 0.005 | 0.005 | 0.0025 | 0.0280 | 0.90 | 0.20 | 0.40 | 0.5 |
| H | 0.54 | 1.40 | 0.70 | 0.019 | 0.019 | 0.0045 | 0.0400 | 0.70 | — | — | — |
| I | 0.60 | 2.00 | 0.68 | 0.020 | 0.020 | 0.0045 | 0.0350 | 0.15 | — | — | — |

| Steel Species | Chemical Component Composition (Mass %) | | | | | | | | | |
|---|---|---|---|---|---|---|---|---|---|---|
| | V | Ti | Nb | Zr | Ta | Hf | Mg | Ca | REM | B |
| A | — | 0.150 | — | — | — | — | — | — | — | 0.0030 |
| B | 0.170 | 0.070 | — | — | — | — | — | — | — | — |
| C | 0.100 | — | — | — | 0.050 | 0.050 | 0.0020 | — | — | — |
| D | 0.150 | 0.077 | — | — | — | — | — | — | — | — |
| E | — | 0.050 | 0.050 | — | — | — | — | 0.0020 | — | — |
| F | — | 0.080 | — | 0.050 | — | — | — | — | 0.0015 | — |
| G | — | — | — | — | — | — | — | — | — | — |
| H | — | — | — | — | — | — | — | — | — | — |
| I | — | — | — | — | — | — | — | — | — | — |

Remainder: iron and unavoidable impurities other than P and S

Using the above-described extruded billets, extruded pipes having an outer diameter of 54 mmφ and an inner diameter of 38 mmφ were prepared (average cooling rate until the temperature was achieved to 720° C. after extrusion: 2° C./sec). Next, cold working (draw benching and rolling), annealing (Table 2 described below), and pickling were repeated multiple times. As a result, hollow seamless pipes having an outer diameter of 16 mm and an inner diameter of 7.6 mm or 8.0 mm were prepared (Table 2 described below). At this time, regarding each of hollow seamless pipes having an inner diameter of 7.6 mm, at most 0.2 mm (50 μm to 200 μm) of an inner surface layer thereof was polished over the total length by abrasive paper to be removed (a final inner diameter is 7.7 mm to 8.0 mm).

TABLE 2

| Test No. | Steel Species | Processing Size (mm) | Annealing Conditions Atmosphere | Annealing Conditions Temperature (° C.) | Inner Surface Layer Polishing Polishing Amount (μm) | Inner Surface Layer Polishing Abrasive Grain size (#) |
|---|---|---|---|---|---|---|
| 1 | A | 16φ × 8.0φ | Ar Gas | 980 | 0 | — |
| 2 | B | 16φ × 7.6φ | Ar Gas | 980 | 200 | 20 |
| 3 | B | 16φ × 7.6φ | Ar Gas | 950 | 200 | 30 |
| 4 | B | 16φ × 7.6φ | Ar Gas | 950 | 200 | 60 |
| 5 | B | 16φ × 7.6φ | Ar Gas | 980 | 50 | 60 |
| 6 | C | 16φ × 7.6φ | Ar Gas | 980 | 200 | 120 |
| 7 | D | 16φ × 8.0φ | Ar Gas | 980 | 0 | — |
| 8 | D | 16φ × 7.6φ | Ar Gas | 980 | 50 | 20 |
| 9 | D | 16φ × 7.6φ | Ar Gas | 980 | 100 | 20 |
| 10 | D | 16φ × 7.6φ | Ar Gas | 1100 | 100 | 60 |
| 11 | D | 16φ × 7.6φ | Ar Gas | 1040 | 100 | 120 |
| 12 | D | 16φ × 7.6φ | Ar Gas | 980 | 200 | 320 |
| 13 | D | 16φ × 7.6φ | Ar Gas | 980 | 50 | 600 |
| 14 | D | 16φ × 7.6φ | Ar Gas | 980 | 200 | 600 |
| 15 | D | 16φ × 7.6φ | Air | 680 | 100 | 320 |
| 16 | D | 16φ × 7.6φ | Air | 730 | 100 | 320 |
| 17 | D | 16φ × 7.6φ | Air | 770 | 100 | 320 |
| 18 | D | 16φ × 7.6φ | Air | 850 | 100 | 320 |
| 19 | E | 16φ × 7.6φ | Ar Gas | 1080 | 200 | 320 |
| 20 | F | 16φ × 7.6φ | Ar Gas | 1080 | 200 | 320 |
| 21 | G | 16φ × 7.6φ | Ar Gas | 1000 | 200 | 120 |
| 22 | H | 16φ × 7.6φ | Ar Gas | 980 | 200 | 120 |
| 23 | I | 16φ × 7.6φ | Ar Gas | 980 | 200 | 120 |

Regarding each of the obtained hollow seamless pipes, the depth of a decarburized layer in an inner surface layer part, the depth (flaw depth) of a flaw in an inner surface, the width (flaw width) of the flaw, and the number density of coarse carbides (carbides having a circle equivalent diameter of 500 nm or more) were examined by the following methods.

[Measurement of Depth of Decarburized Layer]

A hollow seamless pipe was cut to obtain a test piece, and the depth of a decarburized layer (whole decarburized layer) in an inner surface layer part thereof was measured by observation using an optical microscope according to JIS G0558.

A hollow seamless pipe in which the depth of a decarburized layer was 100 μm or less was evaluated as "Pass" (indicated by the symbol "O"), and a hollow seamless pipe in which the depth of a decarburized layer was more than 100 μm was evaluated as "Fail" (indicated by the symbol "X"). The results are shown in Table 3 described below.

[Measurement of Flaw Depth and Flaw Width in Inner Surface]

Regarding a flaw in an inner surface, in order to observe an arbitrary cross-section (a cross-section of a pipe perpendicular to an axis thereof), the pipe was cut, was filled with a resin, and was polished to obtain an observation sample. The form of a flaw present in an inner surface of the observation sample was observed using an optical microscope. The depth and width of a flaw which was observed at the deepest point in the cross-section were measured.

[Measurement Method of Number Density of Coarse Carbides]

Regarding the number density of coarse carbides in an inner surface layer, in order to observe an arbitrary cross-section (a cross-section of a pipe perpendicular to an axis thereof), the pipe was cut, was filled with a resin, was polished, and was subjected to picral corrosion to obtain an observation sample. A surface layer part of the observation sample at a distance of 100 μm from an inner surface thereof was observed (×3,000 magnification) using a scanning electron microscope (SEM). Based on a SEM image (measurement positions: 3 points), the area of a carbide was measured using image analysis software (Image-Pro), followed by converting into a circle equivalent diameter. Regarding carbides having a circle equivalent diameter of 500 nm or more, the number density were measured, and the average thereof is measured.

Figure 2:
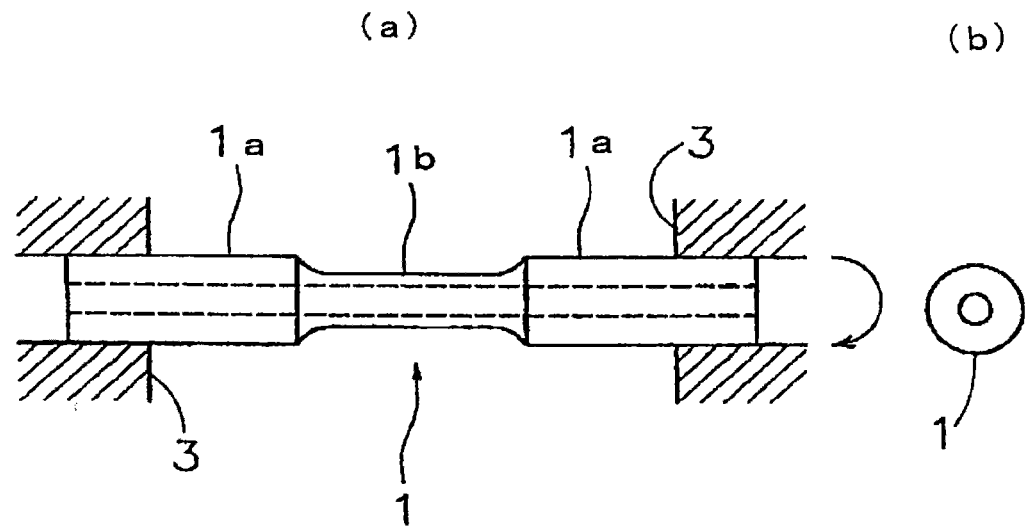
FIGS. 2(a) and 2(b) are diagrams showing a state where a torsional fatigue test is performed.

Each of the above-described hollow seamless pipes was quenched and tempered under the following conditions to prepare a cylindrical test piece 1 shown in FIGS. 2(a) and 2(b) (FIG. 2(a) is a front view and FIG. 2(b) is a side view showing an end surface of the test piece). In the drawings, reference numeral 1a represents a restrained part of the cylindrical test piece, reference numeral 1b represents the center part of the cylindrical test piece, and reference numeral 3 represents a jig which restrains the test piece.
(Quenching and Tempering Conditions)
Quenching conditions: oil cooling after maintaining at 925° C. for 10 minutes Tempering conditions: water cooling after maintaining at 390° C. for 40 minutes
[Torsional Fatigue Test]
Using the cylindrical test piece 1, a torsional fatigue test was performed.
  Inner diameter of test piece: 7.7 mm to 8.0 mm
  Outer diameter of restrained part: 16 mm
  Outer diameter of center part: 12 mm
  Thickness of center part: 2.0 mm to 2.15 mm
  Load stress (stress on outer surface of center part): 550±375 MPa Number of repeated times of test: a test piece which was not ruptured after the test was repeated $10^5$ times was evaluated as "O", and a test piece which was ruptured before the test was repeated $10^5$ times was evaluated as "X".

These results are shown together in Table 3 described below.

TABLE 3

| Test No. | Steel Species | Evaluation of Decarburized Layer | Flaw Depth (μm) | Flaw Width (μm) | Number Density of Coarse Carbides (Particles/μm$^2$) | Result of Torsional Fatigue Test (550 ± 375 MPa) |
|---|---|---|---|---|---|---|
| 1 | A | X | 80 | 16 | $0.8 \times 10^{-2}$ | X |
| 2 | B | O | 55 | 61 | $0.7 \times 10^{-2}$ | X |
| 3 | B | O | 35 | 50 | $1.7 \times 10^{-2}$ | O |
| 4 | B | O | 16 | 27 | $1.8 \times 10^{-2}$ | O |
| 5 | B | X | 30 | 11 | $0.5 \times 10^{-2}$ | X |
| 6 | C | O | 7 | 14 | $0.6 \times 10^{-2}$ | O |
| 7 | D | X | 75 | 14 | $0.5 \times 10^{-2}$ | X |
| 8 | D | O | 55 | 69 | $0.7 \times 10^{-2}$ | X |
| 9 | D | O | 35 | 61 | $0.7 \times 10^{-2}$ | X |
| 10 | D | O | 15 | 30 | $0.1 \times 10^{-2}$ | O |
| 11 | D | O | 6 | 12 | $0.1 \times 10^{-2}$ | O |
| 12 | D | O | 4 | 10 | $0.6 \times 10^{-2}$ | O |
| 13 | D | X | 35 | 12 | $0.6 \times 10^{-2}$ | X |
| 14 | D | O | 2 | 7 | $0.6 \times 10^{-2}$ | O |
| 15 | D | O | 25 | 50 | $5.8 \times 10^{-2}$ | X |
| 16 | D | O | 17 | 43 | $6.5 \times 10^{-2}$ | X |
| 17 | D | O | 20 | 50 | $3.7 \times 10^{-2}$ | X |
| 18 | D | X | 15 | 38 | $1.9 \times 10^{-2}$ | X |
| 19 | E | O | 5 | 13 | $0.1 \times 10^{-2}$ | O |
| 20 | F | O | 5 | 13 | $0.1 \times 10^{-2}$ | O |
| 21 | G | O | 10 | 20 | $0.2 \times 10^{-2}$ | O |
| 22 | H | O | 10 | 20 | $1.4 \times 10^{-2}$ | O |
| 23 | I | O | 10 | 20 | $1.4 \times 10^{-2}$ | O |

As is apparent from these results, the hollow seamless pipes obtained under the proper production conditions (Test Nos. 3, 4, 6, 10 to 12, 14, and 19 to 23: examples of the present invention) satisfy the requirements specified in the present invention, and it is revealed that the hollow seamless pipes having good torsional fatigue strength are obtained.

On the other hand, the hollow seamless pipes of Test Nos. 1, 2, 5, 7 to 9, 13, and 15 to 18 (comparative examples) do not satisfy the requirements specified in the present invention because of the improper production methods, and it is revealed that the fatigue strength for springs is deteriorated. That is, in the hollow seamless pipes of Test Nos. 1 and 7, the surface layer of the inner peripheral surface was not polished. As a result, the depth of the decarburized layer is large, the flaw depth is large, and the fatigue strength (durability) is decreased. In the hollow seamless pipe of Test No. 2, the abrasive grain size (#) used for polishing the surface layer of the inner peripheral surface is small. As a result, the flaw depth and the flaw width are large, and the fatigue strength (durability) is decreased.

In the hollow seamless pipe of Test No. 5, the polishing amount of the surface layer of the inner peripheral surface is small. As a result, the depth of the decarburized layer is large, and the fatigue strength (durability) is decreased. In the hollow seamless pipe of Test No. 8, the polishing amount of the surface layer of the inner peripheral surface is small, and the abrasive grain size (#) used for polishing the surface layer of the inner peripheral surface is small. As a result, the flaw depth and the flaw width are large, and the fatigue strength (durability) is decreased.

In the hollow seamless pipe of Test No. 9, the abrasive grain size is small. As a result, the flaw width is large, and the fatigue strength (durability) is decreased. In the hollow seamless pipe of Test No. 13, the abrasive grain size (#) used for polishing the surface layer of the inner peripheral surface is large, but the polishing amount of the surface layer of the inner peripheral surface is small. As a result, the depth of the decarburized layer is large, and the fatigue strength (durability) is decreased.

In the hollow seamless pipes of Test Nos. 15 to 18, annealing was performed in air, and the temperature during annealing was low. As a result, the number density of coarse carbides is large, and the fatigue strength (durability) is decreased. Among these, in the hollow seamless pipe of Test No. 18, by setting the annealing temperature to 850° C., the depth of the decarburized layer is large by the effect of the occurrence of ferrite decarburization.

Hereinbefore, the embodiments of the present invention have been described in detail. However, the present invention is not limited to the above-described embodiments, and various modifications can be made therein without departing from the spirit and scope thereof.

This application is based on Japanese Patent Application No. 2012-084334 filed on Apr. 2, 2012, the entire subject matter of which is incorporated herein by reference.

INDUSTRIAL APPLICABILITY

In the present invention, a chemical component composition of a steel material as a material is properly adjusted, and production conditions thereof are strictly defined, thereby being able to realize a hollow seamless pipe, in which a depth of a decarburized layer in an inner surface layer part is reduced as much as possible, the form of a flaw present in an inner surface thereof is controlled, and the number of coarse carbides present in the inner surface layer part is reduced. It becomes possible to secure sufficient fatigue strength in a spring to be formed from such a hollow seamless pipe.

The invention claimed is:

1. A hollow seamless pipe suitable for a high-strength spring, comprising a steel material comprising 0.2 mass % to 0.7 mass % of C, 0.5 mass % to 3 mass % of Si, 0.1 mass % to 2 mass % of Mn, more than 0 mass % and 0.1 mass % or less of Al, more than 0 mass % and 3 mass % or less of Cr, more than 0 mass % and 0.02 mass % or less of P, more than 0 mass % and 0.02 mass % or less of S, and more than 0 mass % and 0.02 mass % or less of N, wherein a depth of a whole decarburized layer in an inner surface layer part is 100 µm or less, a depth of a flaw which is present in an inner surface is 40 µm or less, a width of the flaw is 60 µm or less, and a number density of a carbide which has a circle equivalent diameter of 500 nm or more and is present the inner surface layer part is $1.8 \times 10^{-2}$ particles/µm² or less.

2. The hollow seamless pipe suitable for a high-strength spring according to claim 1, wherein the steel material further comprises at leas one of the following groups (a) to (f):
 (a) more than 0 mass % and 0.015 mass % or less of B,
 (b) one or more kinds selected from the group consisting of: more than 0 mass % and 1 mass % or less of V; more than 0 mass % and 0.3 mass % or less of Ti; and more than 0 mass % and 0.3 mass % or less of Nb,
 (c) one or more kinds selected from the group consisting of: more than mass % and 3 mass % or less of Ni; and more than 0 mass % and 3 mass % or less of Cu,
 (d) more than 0 mass % and 2 mass % or less of Mo,
 (e) one or more kinds selected from the group consisting of: more than 0 mass % and 0.005 mass % or less of Ca; more than 0 mass % and 0.005 mass % or less of Mg; and more than 0 mass % and 0.02 mass % or less of REM, and
 (f) one or more kinds selected from the group consisting of: more than 0 mass % and 0.1 mass % or less of Zr; more than 0 mass % and 0.1 mass % or less of Ta; and more than 0 mass % and 0.1 mass % or less of Hf.

3. The hollow seamless pipe suitable for a high-strength spring according to claim 1, wherein the depth of a flaw which is present in an inner surface is 30 µm or less.

4. The hollow seamless pipe suitable for a high-strength spring according to claim 1. wherein the depth of a flaw which is present in an inner surface is 20 µm or less.

5. The hollow seamless pipe suitable for a high-strength spring according to claim 1, wherein the width of the flaw is 40 µm or less.

6. The hollow seamless pipe suitable for a high-strength spring according to claim 1, wherein the width of the flaw is 20 µm or less.

7. The hollow seamless pipe suitable for a high-strength spring according to claim 1, wherein the depth of a decarburized layer is 80 µm or less.

8. The hollow seamless pipe suitable for a high-strength spring according to claim 1, wherein the depth of a decarburized layer is 60 µm or less.

9. The hollow seamless pipe suitable for a high-strength spring according to claim 1, wherein the number density of a carbide which has a circle equivalent diameter of 500 nm or more and is present in the inner surface layer part is $1.5 \times 10^{-2}$ particles/µm² or less.

10. The hollow seamless pipe suitable for a high-strength spring according to claim 1, wherein the number density of a carbide which has a circle equivalent diameter of 500 nm or more and is present in the inner surface layer part is $1.0 \times 10^{-2}$ particles/µm² or less.

11. The hollow seamless pipe suitable for a high-strength spring according to claim 1, comprising 0.35 mass % to 0.60 mass % of C.

12. The hollow seamless pipe suitable for a high-strength spring according to claim 1, comprising 1.5 mass % to 2.2 mass % of Si.

13. The hollow seamless pipe suitable for a high-strength spring according to claim 1, comprising 0.2 mass % to 1.0 mass % of Mn.

14. The hollow seamless pipe suitable for a high-strength spring according to claim 1, comprising 0.05 mass % or less of Al.

15. The hollow seamless pipe suitable for a high-strength spring according to claim 1, comprising 1.7 mass % or less of Cr.

16. The hollow seamless pipe suitable for a high-strength spring according to claim 1, comprising 0.008 mass % or less of P.

17. The hollow seamless pipe suitable for a high-strength spring according to claim I, comprising 0.008 mass % or less of S.

18. The hollow seamless pipe suitable for a high-strength spring according to claim 1, comprising 0.0050 mass % or less of N.

* * * * *